(12) United States Patent
Crump et al.

(10) Patent No.: US 7,125,512 B2
(45) Date of Patent: Oct. 24, 2006

(54) RAPID PROTOTYPE INJECTION MOLDING

(75) Inventors: Steven Scott Crump, Wayzata, MN (US); William R. Priedeman, Jr., Long Lake, MN (US); Jeffery J. Hanson, Shakopee, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 10/511,787

(22) PCT Filed: Apr. 17, 2003

(86) PCT No.: PCT/US03/11854

§ 371 (c)(1),
(2), (4) Date: Oct. 15, 2004

(87) PCT Pub. No.: WO03/089222

PCT Pub. Date: Oct. 30, 2003

(65) Prior Publication Data

US 2005/0173839 A1    Aug. 11, 2005

Related U.S. Application Data

(60) Provisional application No. 60/373,332, filed on Apr. 17, 2002.

(51) Int. Cl.
*B29C 45/00* (2006.01)

(52) U.S. Cl. .......... 264/328.1; 264/401; 264/464; 264/442

(58) Field of Classification Search .......... None
See application file for complete search history.

(56) References Cited

U.S. PATENT DOCUMENTS

| | | | | |
|---|---|---|---|---|
| 5,938,876 | A * | 8/1999 | Edwards et al. | 156/99 |
| 5,952,018 | A * | 9/1999 | Beldue et al. | 425/556 |
| 6,287,428 | B1 * | 9/2001 | Gale et al. | 162/382 |
| 6,355,196 | B1 * | 3/2002 | Kotnis et al. | 264/219 |
| 6,790,403 | B1 * | 9/2004 | Priedeman et al. | 264/442 |

OTHER PUBLICATIONS

Rosato, Dominick V., Donald Rosato, Marlene Rosato. Injection Molding Handbook (3rd ed.) Boston: Kluwer Academic Publishers. 2000. pp. 147, 150, 263, 334, 354, 445, 692-693.*
Rosato, Dominick V., Donald V. Rosato, and Marlene Rosat. "Injection Molding Handbook" (3rd ed.) Boston: Kluwer Academic Publishers. 2000. p. 29.*

* cited by examiner

*Primary Examiner*—Christina Johnson
*Assistant Examiner*—Monica A Huson
(74) *Attorney, Agent, or Firm*—Kinney & Lange, P.A.

(57) ABSTRACT

Disclosed is a method and apparatus for making a prototype injection molded part. An extruder of the type used for fused deposition modeling injects production thermoplastic material into a heated nonconductive plastic mold tool slowly at low pressure in an isothermic process. The mold tool may be built from a CAD drawing by fused deposition modeling or another rapid prototyping technique. Using the present invention, an injection molded prototype part can be made from a digital representation of the part within 24 hours by an engineer in an office environment.

44 Claims, 4 Drawing Sheets

RAPID PROTOTYPE INJECTION MOLDING

CROSS-REFERENCE TO RELATED APPLICATIONS

This application is a United States national phase entry of PCT International Application No. PCT/US03/11854, filed on Apr. 17, 2003, which claims the benefit of U.S. Provisional Application No. 60/373,332, filed Apr. 17, 2002.

BACKGROUND OF THE INVENTION

The present invention relates to prototyping of injection molded objects, and more particularly to an office-compatible method for rapidly making plastic injection molded prototypes parts.

In a typical injection molding process, plastic is injected at high pressures, extremely quickly, into a thermally conductive metal mold. The molded part is quickly cooled to a temperature at which it can be removed from the mold. The part is then quickly ejected from the mold so that another part can be made, and so that the part does not become stuck on the mold (due to shrink differential). Cooling of large parts continues on a fixture. The goals of production injection modeling are to produce a high quantity of high-quality parts in a short turn-around time. A thirty second cycle time or less for the making of each molded part is typical.

In order to produce a three-dimensional object in a typical injection molding process, it is necessary to prepare a mold tool that has a cavity which is complementary to the desired shape of the three-dimensional object. The mold tool generally consists of two opposing halves, which mate together to define the mold cavity. The mold tool is normally machined out of steel or other metal which is capable of withstanding high temperature and pressure when hot liquid is injected into the mold. In use, the mold tool is inserted into a frame of an injection molding machine, and held in place with high clamping forces to oppose pressure generated inside the mold. The time and skill required to prepare the mold tool are both significant. The machining must be done by skilled craftsmen, and includes the incorporation of a sprue through which the molding material is injected, a vent, cooling lines and ejector pins. Typically, this process involves placing an order with an outside vendor and waiting several weeks or months for delivery, at high cost.

Before undergoing the expense and long lead time associated with conventional metal mold manufacturing, it is desirable to produce a prototype of the part that will have similar characteristics to the production part. The goal is produce a prototype having characteristics sufficiently close to that of the desired final manufactured part so as to permit a close prediction of part performance. Various additive process rapid prototyping (RP) technologies are commonly used to make prototype parts in the design stages of a part. These rapid prototyping technologies include fused deposition modeling (FDM), stereolithography (SLA), selective laser sintering (SLS), laminated object manufacturing (LOM) and jet technology. These additive process techniques produce prototypes useful for evaluating the fit, form and function of a part design, to gain preliminary part approval and to accelerate product development. The strength of a final production part is not, however, replicated in prototypes created by these rapid prototyping techniques. The additive processes create layers, layered stress points and voids in the part resulting in a different internal stress structure than that of the homogeneous injection-molded part. Additionally, many materials used in these processes are weak.

Various methods have been developed for creating mold tools used to make prototype injection molded parts, which may be referred to as "bridge tooling" or "temporary tooling." A number of these methods utilize rapid prototyping techniques, particularly, stereolithography. For example, U.S. Pat. No. 5,439,622 describes the use of stereolithography to form a mold shell, which is then reinforced with an incompressible material and coated with a thermally conductive material. U.S. Pat. No. 5,989,679 describes a mold tool formed by injecting a strengthening material into cavities within an object formed by stereolithography. U.S. Pat. No. 5,952,018 describes a mold tool, including an ejection valve within the mold tool, formed by stereolithography. U.S. Pat. No. 5,641,448 describes the making of a mold tool by depositing a metal coating onto a plastic mold shell produced by stereolithography.

The use of rapid prototyping to create molds for use in processes other than injection molding are also known. For example, U.S. Pat. No. 6,073,056 describes a mold built by stereolithography or fused deposition modeling used to form a vacuum cast part. U.S. Pat. No. 6,103,156 describes the making of a prototype part by pouring a thermoset into a mold formed by a rapid prototyping technique.

Techniques are also known which use a part formed a rapid prototyping process as a master mold pattern to create a prototype mold tool. For example, U.S. Pat. No. 5,189,781 describes the use of a prototype part as the pattern for making a sprayed metal mold. U.S. Pat. No. 5,707,578 uses a prototype created by stereolithography as a master mold.

A commercial process known as the Swiftool™ process uses a prototype part, which may be made by a rapid prototyping technique, as a pattern for creating an epoxy mold. The process takes several days. Another commercial process known as 3D Keltool® makes bridge tooling in a period of several days in a metal-powder sintering process, starting from a master pattern made by stereolithography. Yet another commercial system called AIM™ builds mold tools by stereolithography using UV-sensitive materials.

There is a need for a more rapid, easy to use and low cost method of creating a small number of prototype injection molded parts, that is compatible with an office environment.

BRIEF SUMMARY OF THE INVENTION

The present invention is a method and apparatus for making a prototype plastic injection molded part using a non-conductive plastic mold tool that may be built using a rapid prototyping technique. The prototype part is preferably made from a production thermoplastic material which allows an assessment of the strength of a production part. The production thermoplastic is injected into a mold cavity of the mold tool by an extruder in a slow, low pressure process, under isothermic conditions to form the prototype part. The extruder may be a filament pump (i.e., an FDM head), a piston pump, a screw pump, or other extruder. The prototype part is cooled in the mold cavity to approximately room temperature. The production thermoplastic and the plastic that forms the mold tool are selected so as to have approximately the same shrink characteristics upon cooling. A fused deposition rapid prototyping machine may be the apparatus used to perform the injection.

In a preferred embodiment, the mold tool is made by a fused deposition modeling technique. In one embodiment, the mold tool is built in two or more portions, wherein layers of thermally solidifiable non-conductive material are deposited in a predetermined pattern according to computer file data representing the mold shape. Each mold portion includes a mold surface, a mating surface, and a base which supports the mold and mating surfaces. Together the mold portions define the mold cavity. In an alternate embodiment, the mold tool is made from a soluble material and has a single-piece construction.

Using the present invention, an injection molded prototype part can be made from a digital representation of the part within 24 hours by an engineer in an office environment. The design engineer is empowered to build injection modeled parts from CAD files, similar to how rapid prototyping empowered the design engineer to build prototypes from CAD files.

DETAILED DESCRIPTION

The method and apparatus of the present invention builds a prototype injection molded part using a non-conductive plastic mold tool, which is preferably built using a rapid prototyping technique. The injection is done by extruding a liquified ribbon of material from an extruder of the type used in a fused deposition modeling machine. Extruded material is injected into a mold cavity of the mold tool at a low speed and low pressure. After the mold cavity is filled, the prototype part thus created is allowed to cool inside of the mold tool. The prototype part is preferably made from a production thermoplastic material which allows an assessment of the strength of a production part. A fused deposition modeling machine may be used for the prototype injection molding apparatus.

In contrast to manufacturing injection molding processes, the present invention uses low pressures, low flow rates and slow cycle times, allowing the use of a non-reinforced plastic mold tool and providing a safe process compatible with office use. Using the present invention, an injection-molded prototype can be formed from a digital representation of the desired prototype part within about a 24-hour time period, by an engineer in an office-friendly environment.

Figure 1:
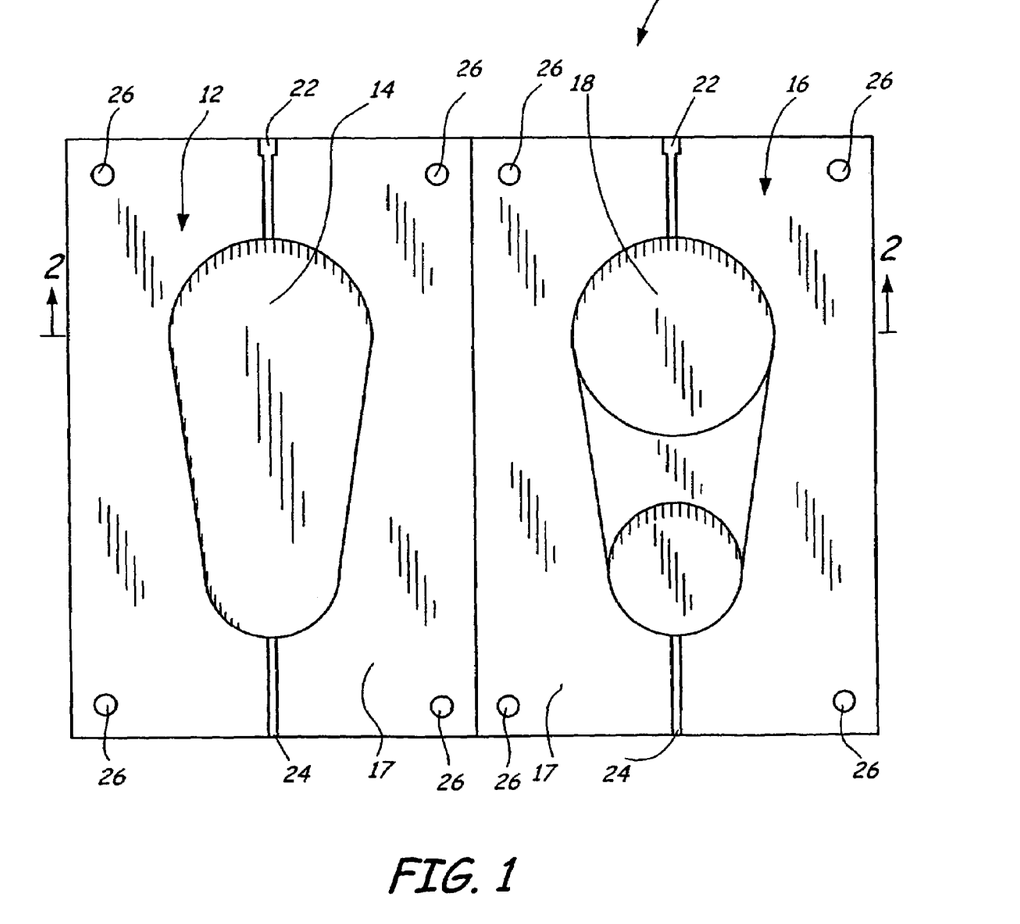
FIG. 1 is a top plan view of two mold portions of an exemplary mold tool for use with the present invention produced by fused deposition modeling
Figure 2:
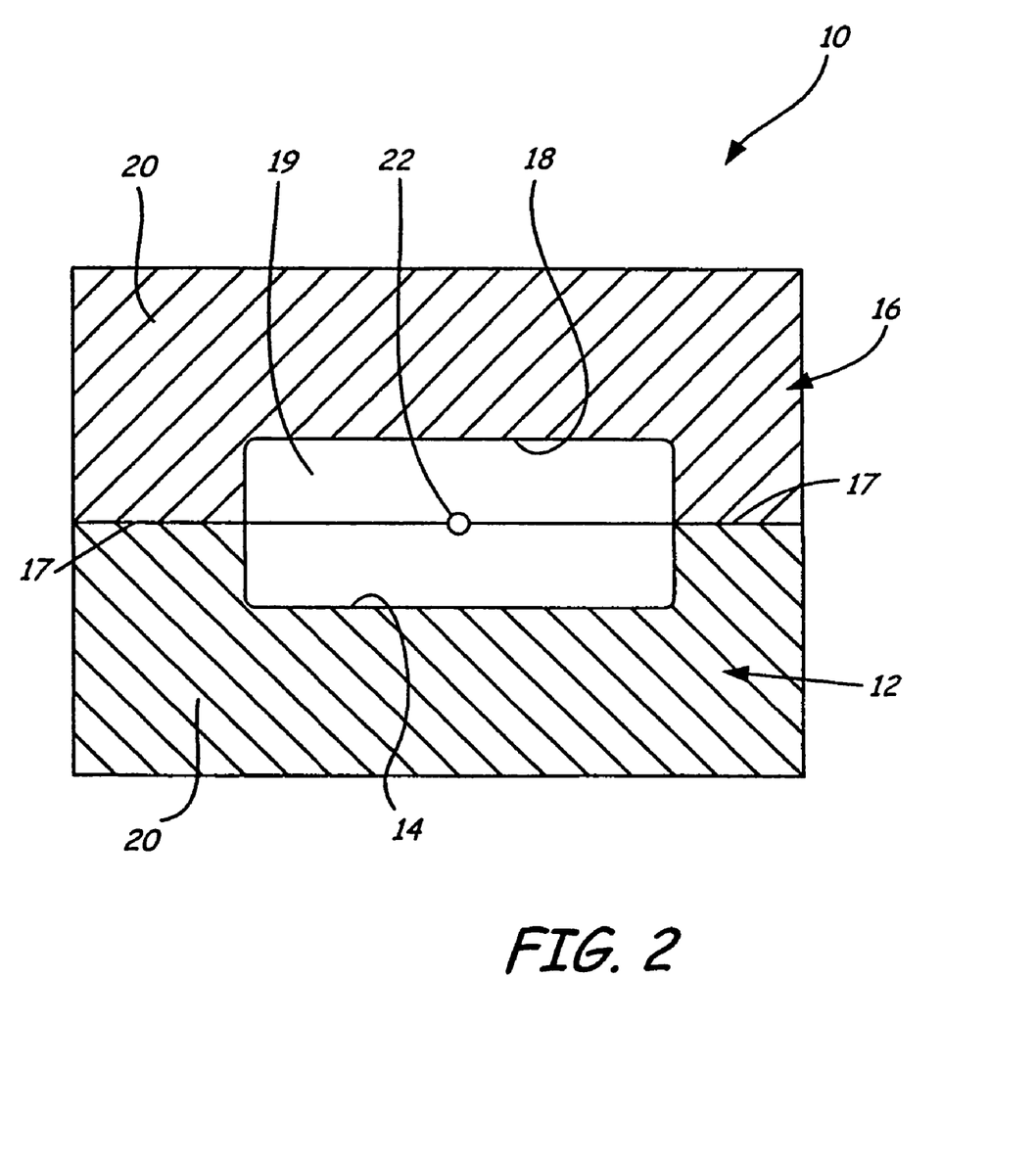
FIG. 2 is a sectional view of the two mold portions of FIG. 1, taken along a line 2—2 of FIG. 1 and mated together to define a mold cavity.

FIG. 1 shows two halves of an exemplary mold tool 10 for use in carrying out the present invention. The exemplary mold tool is the subject of International Application No. PCT/US03/10219 entitled "Layered Deposition Bridge Tooling," filed Apr. 4, 2003, and assigned to the same assignee as the present application, which is hereby incorporated by reference as if set forth fully herein. A first portion 12 of mold tool 10 includes a recessed mold surface 14 corresponding to the shape of a first half of a desired prototype molded part. A second portion 16 of mold tool 10 includes a recessed mold surface 18 corresponding to the shape of a second half of the desired prototype molded part. The mold portions 12 and 16 each have a mating surface 17 and a base 20 shown in FIG. 2, which supports the mold surfaces 14 and 18 and the mating surfaces 17. When the mating surfaces 17 of the mold portions 12 and 16 are mated together as shown in FIG. 2, the mold surfaces 14 and 18 define a mold cavity 19, which has the shape of the desired prototype part. For prototype molded parts that have interior cavities, the mold tool 10 further comprises a mold core.

The mold portions 12 and 16 each also include a sprue channel 22, a vent channel 24, and four alignment holes 26. The sprue channels 22 allow for the placement of a sprue which will be inserted in a final assembly of the mold tool 10, providing a path for the injection of molten plastic into the mold cavity 19. The vent channels 24 together form a passage for the venting of gas from the mold cavity 19 when the mold tool 10 is assembled.

The alignment holes 26 receive screws or pins, which align and hold together the mold tool portions 12 and 16 in assembly of the mold tool 10. The mold tool 10 may also optionally include cooling lines for introducing a flow of coolant during an injection process.

In an alternate embodiment, a mold tool is made from a soluble modeling material and has a single-piece construction. The soluble material permits a single-piece construction, as the mold tool may be dissolved from a prototype part after the part is formed. In contrast, a mold tool made from an insoluble material is removed from a prototype part by mechanically disengaging the mold portions. A suitable soluble modeling material is an alkali-soluble material comprising a base polymer containing a carboxylic acid, and a plasticizer. The base polymer comprises a first comonomer (which contains carboxylic acid) and a second comonomer that is polymerized with the first comonomer to provide thermal and toughness properties suitable for fused deposition modeling. A preferred base polymer is comprised of methacrylic acid as the first comonomer and an alkyl methacrylate (e.g., methyl, ethyl, propyl or butyl methacrylate, and combinations thereof), preferably methyl methacrylate, as the second comonomer. A desirable amount of the acid-containing first comonomer is 15–60 weight percent of the base polymer. The base polymer is plasticized to attain rheological properties desired for the modeling process. Most preferably, the alkali-soluble thermoplastic material contains between about 84 weight percent and 74 weight percent of the base polymer and contains between about 16 weight percent and 26 weight percent of the plasticizer, and has a melt flow index of between about 5 g/10 minutes and 10 g/10 minutes under a load of 1.2 kg at 230° C. A mold tool made from the alkali-soluble material is removed from the prototype part by placing the mold tool containing the part in an alkaline bath. The alkali-soluble modeling material is the subject of co-pending U.S. patent application Ser. No. 10/019,160 and corresponding International Application No. PCT/US00/10592 (published as WO 00/62994), which is hereby incorporated by reference as if set forth fully herein.

The mold tool for use in the present invention is preferably built by a rapid prototyping process, such as by fused deposition modeling, from computer file data representing the mold tool. The computer file data is derived from information available on the desired prototype molded part. For example, typically, the part is designed using a computer-aided design (CAD) system, and corresponding information relating to the outline of the part is derivable from a CAD file defining the desired part. A computer program designs the mold portions in accordance with the outline of the desired part, as the inverse of the desired part shape. For instance, software available from Moldflow Corporation, will design the mold portions in this manner. A further software program "slices" the computer representation of the mold portions into horizontal layers.

Fused deposition modeling builds up three-dimensional objects, such as the mold tool of the present invention, in layers by extruding molten modeling material in a predetermined pattern according to the computer file data representing the mold tool. The modeling machine extrudes the roads of modeling material layer-by-layer, with each extruded road having a thickness equal to the height of a slice. The extruded material fuses to previously deposited material and solidifies upon a drop in temperature to form the mold portions. The mold portions may be built simultaneously in the modeling machine, or one at a time. In a preferred embodiment, the mold portions 12 and 16 are built from a polyphenylsulfone resin on a Stratasys® Titan™ FDM® fused deposition modeling machine.

The sprue channels 22, the vent channels 24 and the alignment holes 26 are preferably formed into the mold portions 12 and 16 as they are built. This can be done by including such features in the computer file data representing the mold tool 10. Alternatively, a sprue channel, vent channel and/or alignment holes may be machined into the mold portions 12 and 16 after they are built. The channels 22 and 24 and the alignment holes 26 shown in the exemplary mold tool 10 are merely one example of the placement and design of such features. Alternative designs include vertical orientation of the channels 22 and 24, and forming a single sprue channel or vent channel within one or the other of mold portions 12 and 16.

The need for a vent channel in the mold tool 10 may be avoided by controlling the extrusion pattern of the roads so that the mold tool 10 has an inherent porosity providing an open-cell matrix sufficient to vent gas from the mold cavity 19. Controlled-porosity fused deposition modeling is taught in U.S. Pat. No. 5,653,925.

The exemplary mold tool 10 is formed from a non-conductive thermoplastic material that will sustain the temperature and pressure of the injection molding process, so as to produce at least one prototype plastic injection molded part. An exemplary thermoplastic comprises at least 50 weight percent of a thermoplastic selected from the group consisting of polycarbonate, polystyrene, acrylics, amorphous polyamides, polyesters, polyphenylsulfone, polysulfone, polyphenylene ether, nylon, PEEK, PEAK, poly(2-ethyl-2-oxazoline), and blends thereof. The thermoplastic resin may contain various fillers, additives and the like, as will be understood by those skilled in the art. A particularly preferred thermoplastic for use in creating a mold tool by fused deposition modeling is a polyphenylsulfone-based resin.

Figure 3:
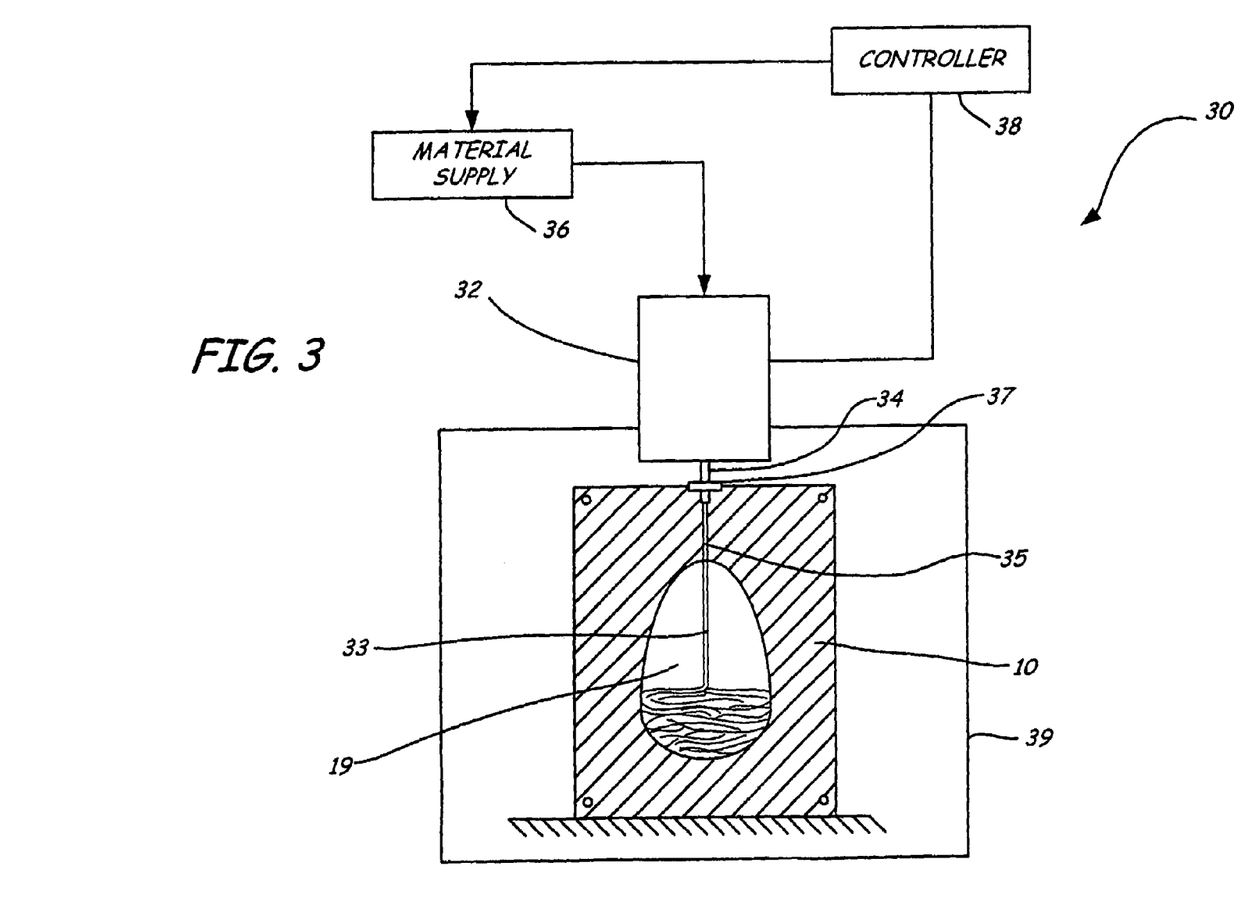
FIG. 3 is a schematic illustration, in partial section, of a rapid prototyping injection molding machine according to the present invention.

FIG. 3 shows an exemplary rapid prototype injection molding apparatus 30 in accordance with the present invention, in the process of making a prototype part. The apparatus 30 comprises an extrusion head 32 having a dispensing tip 34, a material supply 36, a controller 38, a modeling envelope 39, and a hollow sprue 35. The mold tool 10 is assembled and positioned in the apparatus 30. Prior to assembly of the mold tool 10, the mold surfaces 14 and 18 are created with a release agent that facilitates removal of a completed part from the mold tool 10. Suitable release agents include dry film lubricants, and others that will be recognized by those skilled in the art. The mold tool 10 in mounted in the modeling envelope 39. Sprue 35 is placed in the sprue channels 22, such the a dispensing end of the sprue 35 is directed into the mold cavity 19. The sprue 35 has an entry 37 at a top end thereof, designed to mate with the downward-facing extrusion head tip 34. The sprue entry 37 receives and attached to the extrusion head tip 34, thereby providing a flow path from the extrusion head 32 into the mold cavity 19. Preferably, an insulator is provided for the extrusion head tip 34, so that the tip 34 will not cause melting of the prototype part as it is being formed. Also, a pressure transducer (not shown) is placed in the sprue to monitor pressure in the mold cavity so that a predetermined pressure may be maintained.

The apparatus 30 may be a fused deposition modeling machine. It should be understood, however, that unlike fused deposition modeling, the process of the present invention involves no translational movement of the extrusion head. The extrusion head 32 may be of any type which receives a thermoplastic material and dispenses the material in a molten state through a dispensing tip at low flow rates and low pressure. Suitable extrusion heads have been developed for fused deposition modeling, and include a liquifier pump, a piston pump and a screw pump. Each of these extrusion heads developed for three-dimensional modeling receives a feedstock of thermoplastic in solid form, and heats the thermoplastic material to a desired temperature for extrusion.

In the exemplary embodiment, the extrusion head 32 receives a supply of production thermoplastic material for creating the molded prototype part from the material supply 36, at a rate controlled by the controller 38. Where the extrusion head 32 of the exemplary embodiment is a liquifier pump, the material supply 36 comprises spooled flexible filament and the extrusion head 32 carries a set of feed rollers for advancing the filament into the extrusion head at the controlled rate. Liquifier pumps are disclosed, for example, in U.S. Pat. No. 6,004,124. Where the extrusion head 32 of the exemplary embodiment is a piston pump, the material supply 36 comprises cylindrical feed rods of thermoplastic material fed in a batch process. A piston pump extrusion head is disclosed in U.S. Pat. No. 6,067,480. Where the extrusion head 32 of the exemplary embodiment is a screw pump, the material supply 36 comprises pellets of thermoplastic material. A screw pump extrusion head is disclosed, for example, in U.S. Pat. No. 5,312,224. Two-stage extrusion heads are also known in the art, and can also be used in practice of the present invention. A extrusion pump is disclosed in U.S. Pat. No. 5,764,521, wherein the feedstock received from material supply 36 is pressurized in a two-stage process which may take various forms.

The extrusion head 32 may include an ultrasonic vibrator for creating a thixotropic flow at the dispensing tip exit, such as is disclosed in U.S. Pat. No. 5,121,329. The ultrasonic energy would reduce the injection pressure while increasing the flow rate of the production thermoplastic.

For the production of a prototype part, production thermoplastic is provided from the material supply 36 to the extrusion head 32, which heats the production thermoplastic to an extrusion temperature and dispenses molten extruded material 33 through sprue 35 and into the mold cavity 19. Production thermoplastics that may be used in the present invention include, without limitation, ABS, polycarbonate, polystyrene, acrylics, amorphous polyamides, polyesters, polyphenylsulfone, polyphenylene ether, nylon, PEEK, PEAK, and blends thereof. The production thermoplastic may, of course, include various fillers, additives and the like. Shrink characteristics of the mold tool plastic are matched to the shrink characteristics of the production thermoplastic, which can be achieved by using amorphous thermoplastics. Also, the production thermoplastic must have a heat deflection temperature lower than a heat deflection temperature of the plastic which forms the mold tool, so that the mold tool will maintain its shape.

Figure 4:
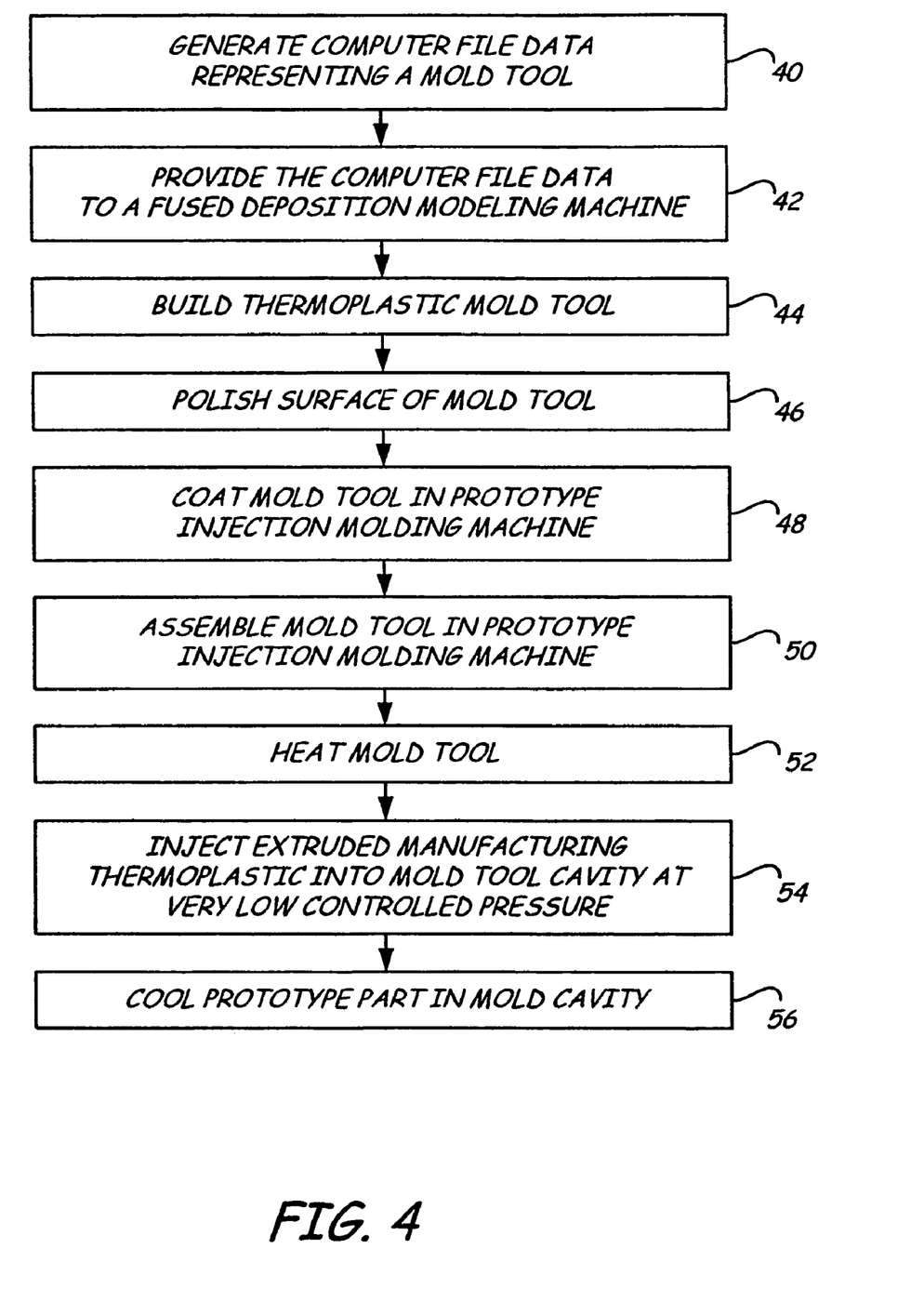
FIG. 4 is a flow diagram of the process of making a prototype injection molded part in accordance with the present invention, using a mold tool made by fused deposition modeling.

FIG. 4 shows a flow diagram which summarizes an exemplary method of producing a prototype injection molded part in accordance with the present invention, using a mold tool made by fused deposition modeling. A CAD tool is used to generate computer file data representing a mold tool, in a step 40. The data is provided to a fused deposition modeling machine, in a step 42. The mold tool is built in the fused deposition modeling machine, in layers defined by the computer file data, in a step 44. In a step 46, the mold surfaces and/or mating surfaces of the mold tool are smoothed to remove ridges unintentionally created in the formation of the mold tool.

In a preferred embodiment, the smoothing is done in a vapor smoothing process, which is the subject of International Application No. PCT/US03/10220 entitled "Smoothing Method For Layered Deposition Modeling," filed Apr. 4, 2003, assigned to the same assignee as the present application, and hereby incorporated by reference as if set forth fully herein. As is disclosed in said co-pending application, the surfaces of the mold tool can be smoothed by placing the mold tool in a vaporizer and exposing it to vapors of a solvent until a desired surface finish is obtained. The solvent is selected to be compatible with the material which forms the mold tool. Suitable solvents will react with the material so as to soften and flow the material at the object surfaces. A preferred solvent for use with a wide range of amorphous thermoplastics is methylene chloride. Other suitable solvents will be recognized by those skilled in the art, for instance, an n-Propyl bromide solution (e.g., Abzol®), perchloroethylene, trichloroethylene, and a hydrofluorocarbon fluid sold under the name Vertrel®. Vapor smoothing will also serve to seal the surfaces of the mold tool. As is taught in said co-pending application, certain mold features may be identified for solvent masking or for pre-distortion prior to the vapor smoothing step, and the computer file data representing the mold tool may include data identifying said features. Alternatively, smoothing can be done by applying a liquid solvent. Other alternative smoothing techniques include sanding, grinding, and thermal ironing.

The mold surfaces of the mold tool are then coated with a release agent, in a step 48 (a soluble mold tool may not need a release agent). Suitable release agents include dry film lubricants, and others that will be recognized by those skilled in the art. If needed, sprue and vent channels and alignment holes are machined into the mold tool prior to step 48. The mold tool is assembled in an prototype injection molding apparatus according to the present invention, without the addition of any conductive fill material or layers, in a step 50. The fused deposition modeling machine used to build the mold tool may be used also as the prototype injection molding apparatus.

In step 50, the sprue is positioned in the mold tool and attached to a dispensing tip of an extrusion head. The mold may be clamped to a fixture to hold it in place, using a clamp or other means. A clamping force of less than or equal to about 10 tons will ensure office compatibility of the injection process. The mold tool is then heated to a predetermined temperature, in a step 52.

Injection molding is then performed, in a step 54. Production thermoplastic is injected from an extrusion head of the molding apparatus into the mold tool, at low speed and low pressure. If an ultrasonic vibrator is used in the extrusion head, a thixotropic flow of thermoplastic will be injected. During the injection, pressure is preferably monitored, such as by a pressure transducer placed in the mold cavity or sprue. A system controller can adjust the extrusion flow rate based upon pressure reading from the transducer, to maintain the pressure within a target range. The target pressure will typically be less than 5000 psi and may be set at less than 500 psi, to as low as less than 20 psi (near-zero pressure).

Filling the mold cavity will typically take about 1–2 hours. During this time, the temperature of the mold and the production thermoplastic remain approximately constant, as the plastic mold is a thermal insulator having a high thermal resistance. In the exemplary embodiment, the mold tool is heated prior to the injection step 54, to provide isothermic conditions. Various techniques may be used to heat the mold, as will be recognized by those skilled in the art. A temperature sensor may be placed in the mold cavity, and temperature of the thermoplastic flow, the mold tool, and/or the build environment can then be adjusted as needed to maintain isothermic conditions. Maintaining the temperature of the mold tool at approximately the extrusion temperature of the production thermoplastic prevents premature solidification of the production thermoplastic, so that the mold cavity can fill completely before the prototype part hardens. It should be understood, however, that some materials and process parameters may provide isothermic conditions without the need for pre-heating the mold, in which case step 52 may be omitted. Also, it may be desirable to heat the mold cavity and inner mold surface, rather than heating the entire mold.

During (and prior to) the injection step 55, a vacuum may be drawn upon the mold tool. This may be done, for example, by placing the mold tool in a vacuum chamber. The vacuum will remove gases from the mold tool and the sprue, through the porosity of the mold or the vent. The vacuum will assist in pulling the injected material into the mold cavity. The vacuum will also facilitate filling the mold cavity more fully and consistently than would be achieved under normal atmospheric conditions, resulting in a void-free part.

When the mold cavity is filled, injection of material into the mold cavity is terminated and the prototype part is allowed to cool inside the mold tool, in a step 56. Cooling may take from 1 to 2 hours. Pressure may be placed on the mold tool during cooling, to compensate for shrinkage of the mold tool and the prototype part. If desired, active cooling may be used to speed the cooling process. Also, monitoring of pressure in the mold cavity may be continued during cooling. Cooling in the mold tool may be allowed to continue until the prototype part reaches room temperature, or the part may be removed when it is substantially cool.

Using the method of the present invention, a prototype plastic injection molded part can be produced within a 24-hour time period. Up to 50 prototype injection molded parts could be produced within 48 hours.

It should be understood that a mold tool for use in carrying out the present invention need not be limited to a thermoplastic mold build by a deposition modeling process. Rather, any non-conductive plastic mold tool compatible with the injection process may be utilized, including, for example, mold tools formed by stereolithography, thermoset mold tools, and mold tools formed by a machine-removable process (e.g., CAM/CNC). A plastic material forming the mold tool may include various fillers, additives and the like.

Although the present invention has been described with reference to preferred embodiments, the invention is defined by the claims. Workers skilled in the art will recognize that changes may be made in form and detail without departing from the spirit and scope of the invention.

For example, in one alternate embodiment, the mold tool is transparent and a photopolymer is used to form the prototype part. The photopolymer is injected into the mold cavity and cured by exposure to light. In another embodiment, thermoset reaction injection molding techniques are employed. Two or more reactant materials are mixed together to form a thermoset resin, which is injected into the mold tool. The resin is cured to form the prototype part by applying heat to the mold tool.

The invention claimed is:

1. A method for making a prototype plastic injection molded part, comprising the steps of:
providing a plastic mold tool defining a mold cavity;
injecting a liquified ribbon of plastic material into the mold cavity using an extrusion head at a pressure of less than 20 psi, until the material fills the cavity;
curing the plastic material in the mold cavity to form the prototype part.

2. The method of claim 1, wherein the plastic mold tool is formed from an alkali-soluble modeling material.

3. The method of claim 1 and further comprising:
heating the mold tool to approximately the extrusion temperature, prior to the injecting step.

4. The method of claim 1, further comprising building the plastic mold tool using a rapid prototyping technique based at least in part on computer data.

5. The method of claim 4, wherein the plastic mold tool is built in a fused deposition modeling machine.

6. The method of claim 5, wherein the building step and the injecting step are performed in the same fused deposition modeling machine.

7. The method of claim 1, and further comprising the step of:
clamping the mold tool to a fixture with a clamping force of less than or equal to 10 tons, prior to the injecting step.

8. The method of claim 1, wherein the injection step is an adiabatic process.

9. A method for making a prototype plastic injection molded part, comprising the steps of:
providing a plastic mold tool defining a mold cavity;
injecting a thermoplastic material into the mold cavity as a liquified ribbon of material using an extrusion head, at a pressure of less than 20 psi, so that the thermoplastic material fills the mold cavity; and
cooling the thermoplastic material in the mold cavity to form the prototype part.

10. The method of claim 9 and further comprising the step of:
building the mold tool using a rapid prototyping technique, based on computer file data representing a desired prototype part.

11. The method of claim 10, wherein the mold tool is built in a fused deposition modeling machine.

12. The method of claim 11, wherein the building step and the injecting step are performed in the same fused deposition modeling machine.

13. The method of claim 9, wherein the injecting step is done in a fused deposition modeling machine.

14. The method of claim 9, wherein the mold material is injected into the mold cavity using a melt extruder.

15. The method of claim 14, wherein the melt extruder comprises a filament pump.

16. The method of claim 14, wherein the melt extruder comprises a piston pump.

17. The method of claim 14, and further comprising the steps of:
positioning a sprue in the mold tool such that a dispensing end of the sprue is directed into the mold cavity; and
attaching an inlet end of the sprue to a dispensing tip of the melt extruder;
wherein the thermoplastic material is injected from the melt extruder into the mold cavity via the sprue.

18. The method of claim 14, wherein ultrasonic energy is induced in the extruder during the injecting step creating a thixotropic flow of thermoplastic.

19. The method of claim 9 and further comprising:
heating the mold tool to approximately the extrusion temperature, prior to the injecting step.

20. The method of claim 9 and further comprising:
coating surfaces of the mold cavity with a release agent, prior to the injecting step.

21. The method of claim 9, and further comprising the step of:
monitoring pressure in the mold cavity during the injecting step and responsively adjusting the injection pressure.

22. The method of claim 9, wherein the plastic mold tool is formed from an alkali-soluble modeling material.

23. The method of claim 9, wherein the thermoplastic material comprises a curable material.

24. The method of claim 9, wherein the curable material is selected from the group consisting of a photopolymer and a thermosetting material.

25. The method of claim 9, and further comprising the step of:
clamping the mold tool to a fixture with a clamping force of less than or equal to 10 tons, prior to the injecting step.

26. The method of claim 9, and further comprising the step of:
maintaining constant pressure on the mold tool during the cooling step to compensate for shrinkage of the prototype part and the mold tool.

27. The method of claim 9, wherein the prototype part is cooled in the mold cavity to a temperature approximating room temperature.

28. The method of claim 9, and further comprising the step of:
vapor smoothing surfaces of the mold tool prior to the injecting step.

29. The method of claim 9, wherein the thermoplastic material is selected from a group consisting of ABS, polycarbonate, polystyrene, acrylics, amorphous polyamides, polyesters, polyphenylsulfone, polyphenylene ether, nylon, PEEK, PEAK, and blends thereof.

30. The method of claim 9, wherein the plastic mold tool is formed from a thermoplastic material comprising at least 50 weight percent of a thermoplastic selected from the group consisting of polycarbonate, polystyrene, acrylics, amorphous polyamides, polyesters, polyphenylsulfone, polysulfone, polyphenylene ether, nylon, PEEK, PEAK, poly(2-ethyl-2-oxazoline), and blends thereof.

31. The method of claim 30, wherein the thermoplastic forming the mold tool comprises a polyphenylsulfone-based resin.

32. The method of claim 30, wherein the thermoplastic forming the mold tool comprises a polyphenylsulfone-based resin and the injected thermoplastic is ABS.

33. The method of claim 9, wherein the injecting step is performed using a vacuum assist.

34. The method of claim 9, wherein the injection step is an adiabatic process.

35. A method for making a prototype plastic injection molded part, comprising the steps of:

providing a plastic mold tool defining a mold cavity, the plastic mold tool being built with an additive process rapid prototyping machine;

injecting a polymer into the mold cavity using the additive process rapid prototyping machine at a pressure of less than 20 psi, until the material fills the cavity; and solidifying the polymer in the mold cavity, thereby forming the molded prototype part.

36. The method of claim 35, wherein the polymer comprises a photopolymer, and wherein solidifying the polymer comprises exposing the polymer to light.

37. The method of claim 35, wherein the rapid prototyping machine comprises a fused deposition modeling machine.

38. The method of claim 35, and further comprising vapor smoothing the plastic mold tool prior to the injecting step.

39. The method of claim 35, and further comprising monitoring pressure in the mold cavity during the injecting step and responsively adjusting the injection pressure.

40. The method of claim 35, wherein the injection step is an adiabatic process.

41. A method for making a prototype plastic injection molded part, comprising the steps of:

providing a plastic mold tool defining a mold cavity;
providing a supply of two or more reactant materials which form a thermoset resin when reacted together;

mixing the reactant materials together;

injecting the reactant materials from an extruder into the mold cavity as a liquified ribbon of material, at a controlled pressure of less than 20 psi, so that the reactant materials fill the cavity;

heating the reactant materials in the mold cavity to form the molded prototype part; and cooling the molded prototype part in the mold cavity.

42. The method of claim 41, further comprising building the plastic mold tool using a rapid prototyping technique based at least in part on computer data.

43. The method of claim 42, wherein the plastic mold tool is built in a fused deposition modeling machine.

44. The method of claim 41, wherein the injection step is an adiabatic process.

* * * * *